(12) United States Patent
Claisse et al.

(10) Patent No.: US 7,942,071 B2
(45) Date of Patent: May 17, 2011

(54) TURBINE FOR MEASURING PETROLEUM PRODUCTS WHICH ARE CHARGED WITH A VISCOSITY REDUCTION AGENT

(75) Inventors: Laurent Claisse, Saclas (FR); David DuPuis, Aillieres Beauvoir (FR)

(73) Assignee: Faure Herman, Le Ferte Bernard (FR)

( * ) Notice: Subject to any disclaimer, the term of this patent is extended or adjusted under 35 U.S.C. 154(b) by 142 days.

(21) Appl. No.: 12/322,215

(22) Filed: Jan. 29, 2009

(65) Prior Publication Data

US 2010/0122584 A1 May 20, 2010

(30) Foreign Application Priority Data

Nov. 19, 2008 (FR) ...................................... 08 57852

(51) Int. Cl.
*G01F 1/05* (2006.01)

(52) U.S. Cl. ................... 73/861.79; 415/191; 416/223 R; 416/175

(58) Field of Classification Search ........................ None
See application file for complete search history.

(56) References Cited

U.S. PATENT DOCUMENTS

| 3,364,743 A | | 1/1968 | Clinton | 73/231 |
| 4,404,861 A | * | 9/1983 | Wass | 73/861.83 |
| 4,408,498 A | * | 10/1983 | Heath | 73/861.79 |
| 5,363,699 A | | 11/1994 | McCall | 73/198 |
| 5,831,177 A | * | 11/1998 | Waid et al. | 73/861.77 |
| 6,257,073 B1 | * | 7/2001 | Lee et al. | 73/861.91 |
| 6,481,293 B1 | | 11/2002 | Walczak et al. | 73/861.77 |

FOREIGN PATENT DOCUMENTS

| GB | 1149616 | 4/1969 |
| GB | 2435310 | 8/2007 |
| WO | WO 92/21939 | 12/1992 |

OTHER PUBLICATIONS

French Search Report, dated Aug. 31, 2009, French Application No. 0857852.

* cited by examiner

*Primary Examiner* — Harshad Patel
(74) *Attorney, Agent, or Firm* — Drinker, Biddle & Reath LLP

(57) ABSTRACT

Turbine comprising a tubular body that receives an upstream stator, a rotor including a propeller and a downstream stator. The trailing edge of the blades of the upstream stator is inclined through a negative angle relative to a normal relative to the axis, and the leading edge of the blades of the propeller is inclined and rounded in an incline directed downstream. The rotational mounting of the propeller in the turbine involves a fixed shaft installed in the upstream and downstream stators, and which carries an upstream bearing bush and a downstream bearing bush, close to the end of the location of the propeller, and a stop formed by a crown of support pins in an upstream and downstream direction. The propeller comprises a tubular hub through which the fixed shaft extends and which has a bearing bush at each end in order to co-operate at the same time with the corresponding bearing bush of the fixed shaft and with the corresponding peripheral stop.

5 Claims, 6 Drawing Sheets

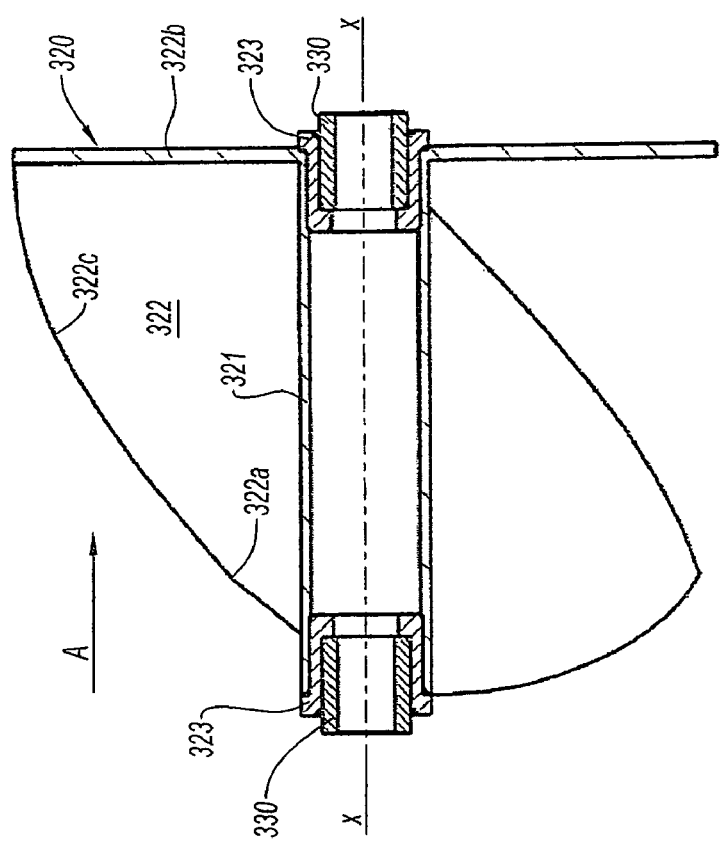
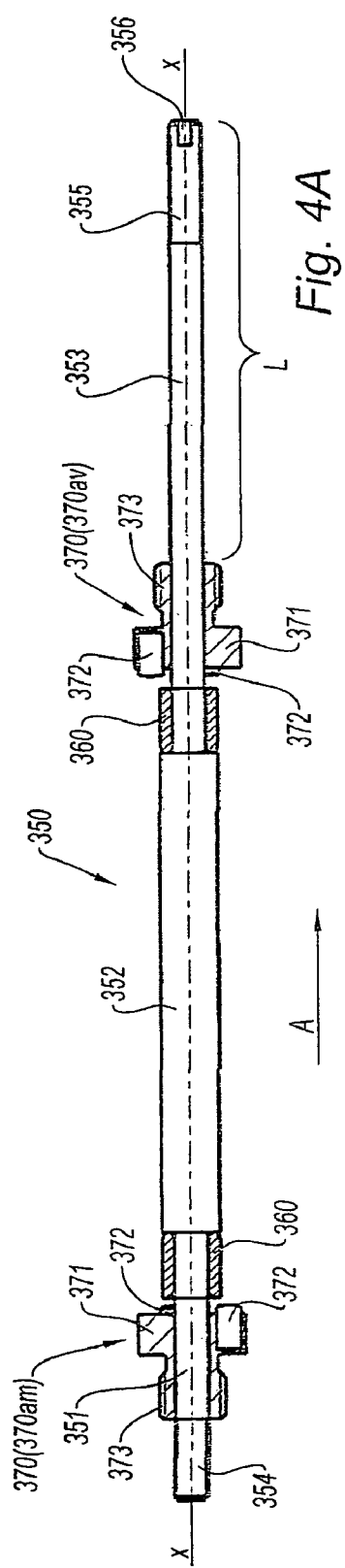
Fig. 4B
Fig. 4A

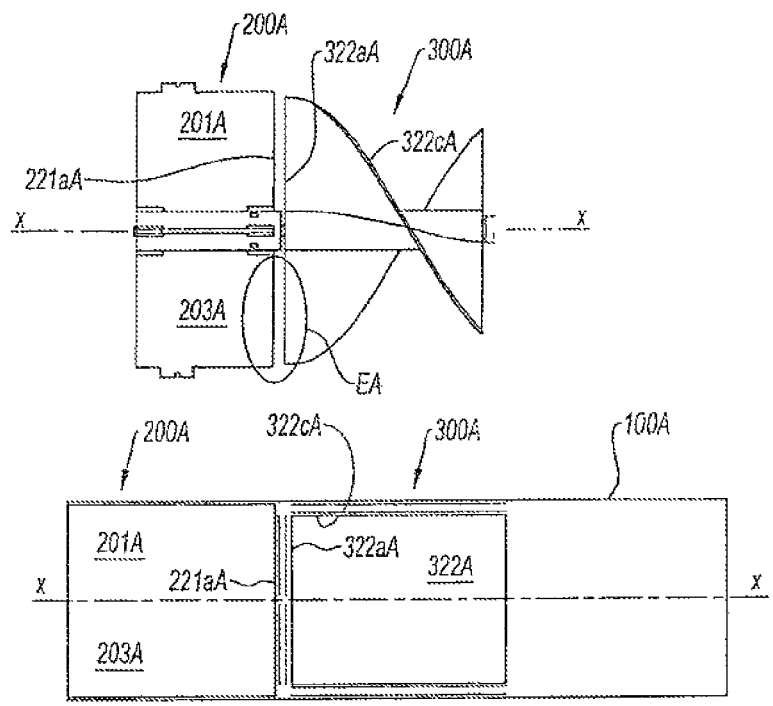
Fig. 7A
PRIOR ART
Fig. 8A
PRIOR ART
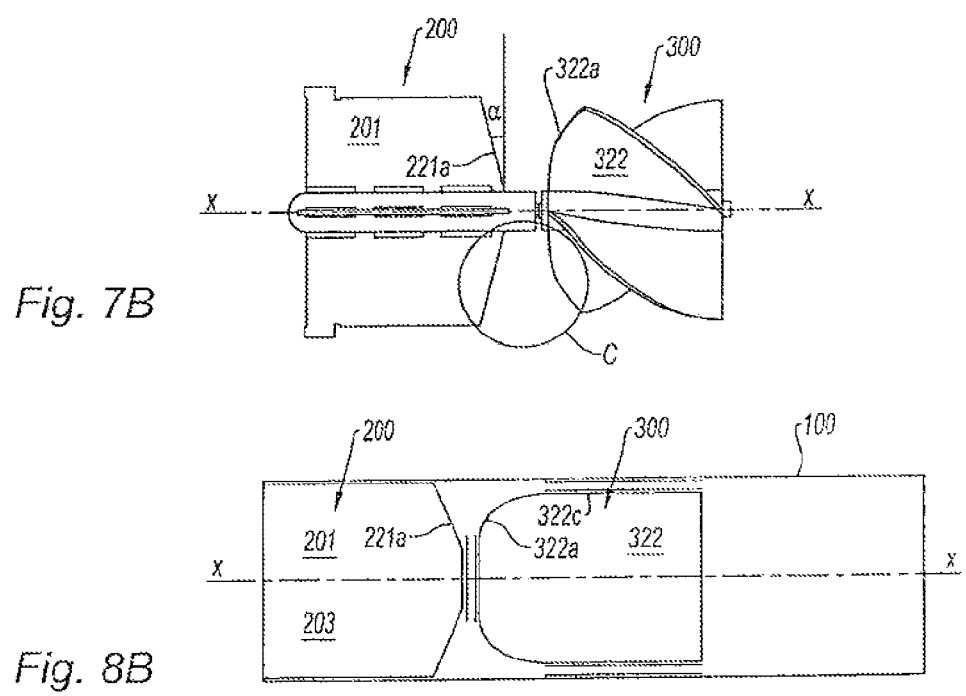
Fig. 7B
Fig. 8B

TURBINE FOR MEASURING PETROLEUM PRODUCTS WHICH ARE CHARGED WITH A VISCOSITY REDUCTION AGENT

FIELD OF THE INVENTION

The present invention relates to a turbine for measuring petroleum products which are charged with a viscosity reduction agent, comprising:
- a tubular body which receives, in the axial extension thereof in the passage direction of the fluid, an upstream stator, a rotor and a downstream stator,
- the stators being formed by cross-members whose blades are planar and parallel with the axis of the turbine, and the rotor being a propeller having a plurality of blades, and
- a means for detecting the rotation of the rotor in order to provide information relating to the output.

PRIOR ART

There are already several versions of turbine flow meters for measuring outputs of fluids, and in particular petroleum products.

In an industrial context where the restrictions for petroleum production are becoming increasingly significant, technical solutions have been implemented in order to improve the production whilst reducing costs.

Current pipelines are used to convey increasingly viscous fluids at increasingly high pressures. Current equipment is not of an adequate size for these new applications and current pipelines which are becoming old cannot withstand high pressures without causing potential risks (thinness linked to corrosion, etc. . . . ).

Three solutions are envisaged by petroleum producers:
1—Producing new pipelines (too costly),
2—Reducing the pressure and the outputs in the pipelines (excessively disadvantageous and costly),
3—Injecting a viscosity reduction agent.

As a viscosity reduction agent, it is possible to use, for example, a drag reduction additive (DRA). This product is constituted by microfibres in the form of liquid and gel. This product is injected into pipelines and it is added to the base fluid to be conveyed.

The addition of this fluid allows pressure losses to be reduced and this allows savings to be made in terms of pumping energy. It also allows the pressure in the lines to be reduced and thus allows the service-life of the old pipelines to be ensured or even increased.

This fluid, which is composed of microfibres, allows notional peripheral layers to be created, thus reducing the friction with respect to the walls. However, since there is less friction at the walls, this also affects the speed profiles and therefore the efficiency levels.

Decreases in the efficiency levels of the filters, valves, measuring elements, etcetera have been found over recent years. A critical point is the measuring element.

It has been found that, if no viscosity reduction agent is used, the efficiency levels of measuring turbines are stable. However, as soon as this viscosity reduction agent is introduced with fluid transfer, that is to say, petroleum products with this additive, the turbines demonstrated efficiency levels which fluctuated over time. This fluctuation was evident for the entire operating time of the turbine. A shift in the performance levels linked to the impact of the viscosity reduction agent on the profile was also found.

An extensive analysis of turbines has shown that the product affects the pivots of blade turbines owing to the deposit of paraffin-containing products at the end of the shaft, generating a high level of adhesion which increases over the between the shaft and the stop owing to the accumulation of the product at the end of the shaft and in the region of the pivots.

Deposits of this product were also found in the region of the propeller of the rotor which again become evident as a shift in the characteristics.

Finally, this product was found to have an influence on the flow profile, creating problems of friction and rotor/stator interaction.

OBJECT OF THE INVENTION

An object of the present invention is to develop a turbine for measuring outputs of products, in particular viscous petroleum products which are charged with viscosity reduction agents, such as a DRA, and which overcomes the disadvantages of the current situation by creating a turbine which is operationally stable over time in spite of the presence of viscosity reduction agents in the fluid which is conveyed.

DESCRIPTION AND ADVANTAGES OF THE INVENTION

To this end, the present invention relates to a turbine of the type set out above, characterized in that
- the trailing edge of the blades of the upstream stator is inclined through a negative angle relative to a normal relative to the axis,
- the leading edge of the blades of the propeller is inclined and rounded in an incline which is directed downstream,
- the rotational mounting of the propeller in the turbine involves:
  - a fixed shaft which is installed in the upstream and downstream stators, and which carries an upstream bearing bush and a downstream bearing bush,
  - a peripheral upstream and downstream stop relative to the upstream bearing bush and the downstream bearing bush, the fixed shaft extending through each of the stops which is formed by a crown of support pins,
  - the propeller comprises a tubular hub through which the fixed shaft extends and which has a bearing bush at each end in order to each co-operate at the same time with the corresponding bearing bush of the fixed shaft and with the corresponding peripheral stop.

The turbine according to the invention which does not require the implementation of complex means but instead has a structure which is particularly simple may be installed in place of an existing turbine without any modification or transformation of the installations. This turbine has no operational fluctuation over time, nor adherence of reduction agents with respect to the edges of the propeller or accumulation of reduction agents in the region of the pivots, preventing any occurrences of friction or fluctuation over time owing to the reduction of the occurrences of viscous friction between the fixed components and the movable components, the trailing edge of the blades of the upstream stator and the leading edge and the top of the blades of the propeller of the rotor. The rotation bearing formed between the bearing bushes of the hub of the propeller and the bearing bushes carried by the fixed shaft prevent the deposit of residues of the viscosity reduction agent. The same applies to the support surfaces of the upstream and downstream stops, formed by a succession of studs, producing a peripheral stop which surrounds the shaft and with which the front face of the bearing bushes of the propeller co-operates. In an assembly position, the propeller is remote from the upstream stop and the downstream stop and, during operation, in accordance with the forces to which the rotating assembly is subjected, expansion phenomena and the like, the downstream bearing bush and, if necessary, the upstream bearing bush, may press against the respective stop surface formed by the succession of pins.

According to another advantageous feature, the fixed shaft comprises a threaded upstream end which is intended to be screwed into a threaded portion produced in the hub of the upstream stator, followed by the location for the upstream stop and the location of the upstream shaft bearing bush, and a central portion of increased diameter which forms a shoulder for the upstream shaft bearing bush and the downstream shaft bearing bush, and downstream of the downstream bearing bush, a downstream stop, the shaft being extended by a length which corresponds to the axial length of the downstream stop to terminate in a threaded portion which is intended to receive the nut which blocks the downstream stator.

This configuration of the fixed shaft allows particularly simple and advantageous mounting of the propeller in the turbine.

According to another advantageous feature, the upstream stop and the downstream stop are each constituted by a body which carries, distributed in a peripheral manner, carbide pins, which form the stop surface, this body terminating in a sleeve which is provided externally with a thread in order to be screwed into a corresponding threaded portion of the upstream hub and the downstream hub, and a passage for the fixed shaft.

This configuration of the upstream and downstream stops allows each stop to be adapted to its function in the turbine whilst simplifying production by making the components uniform.

According to another advantageous feature, the angle of the trailing edge of the blades of the upstream stator relative to the plane perpendicular relative to the axis of the turbine is a negative angle of between 5° and 30° and in particular in the order of 15°.

This angle of the trailing edge of the blades of the upstream stator, together with the inclination of the leading edge of the blades of the propeller, allows depositing of elements which inhibit the viscosity reduction agent to be prevented in a particularly effective manner, providing a consistent operating quality for the turbine, that is to say, the accuracy of the measurements which are allowed to be carried out.

DRAWINGS

The present invention will be described below in greater detail with reference to an embodiment of a turbine which is illustrated in the appended drawings, in which.

Figure 3:
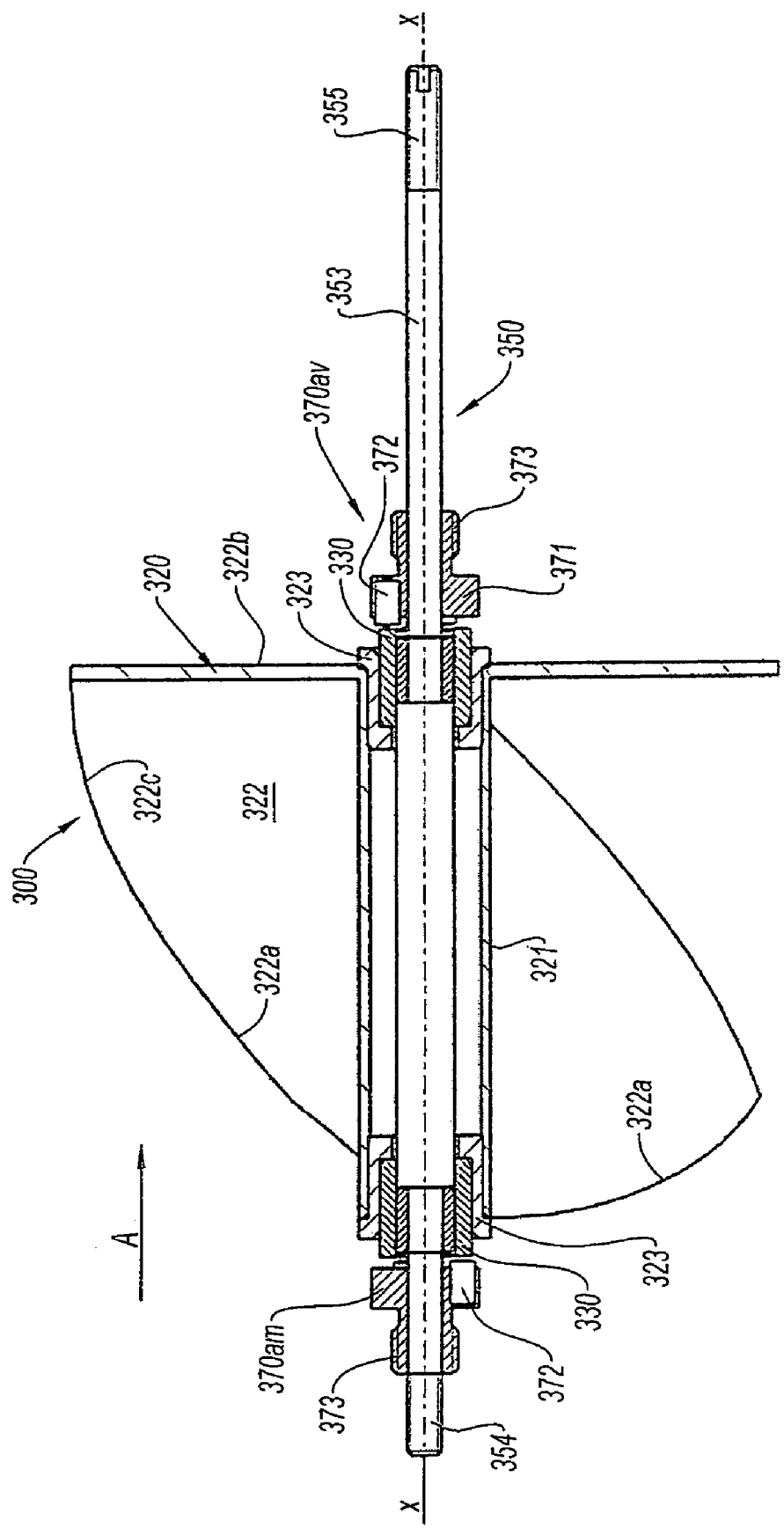
Figure 5:
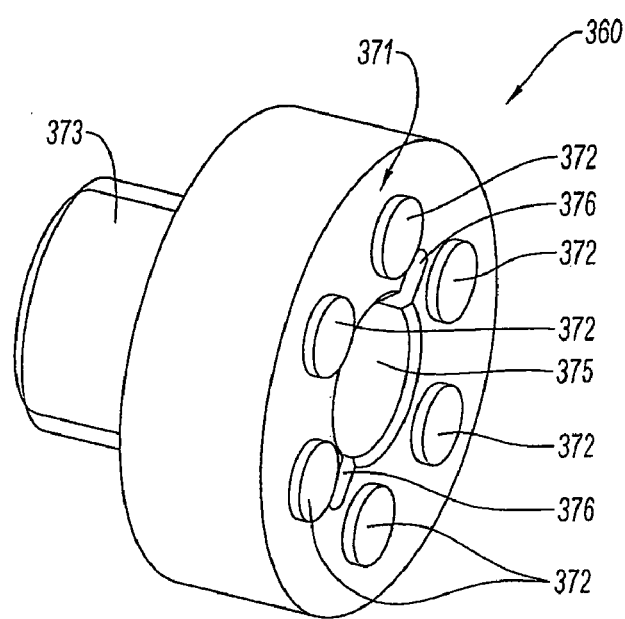
Figure 6:
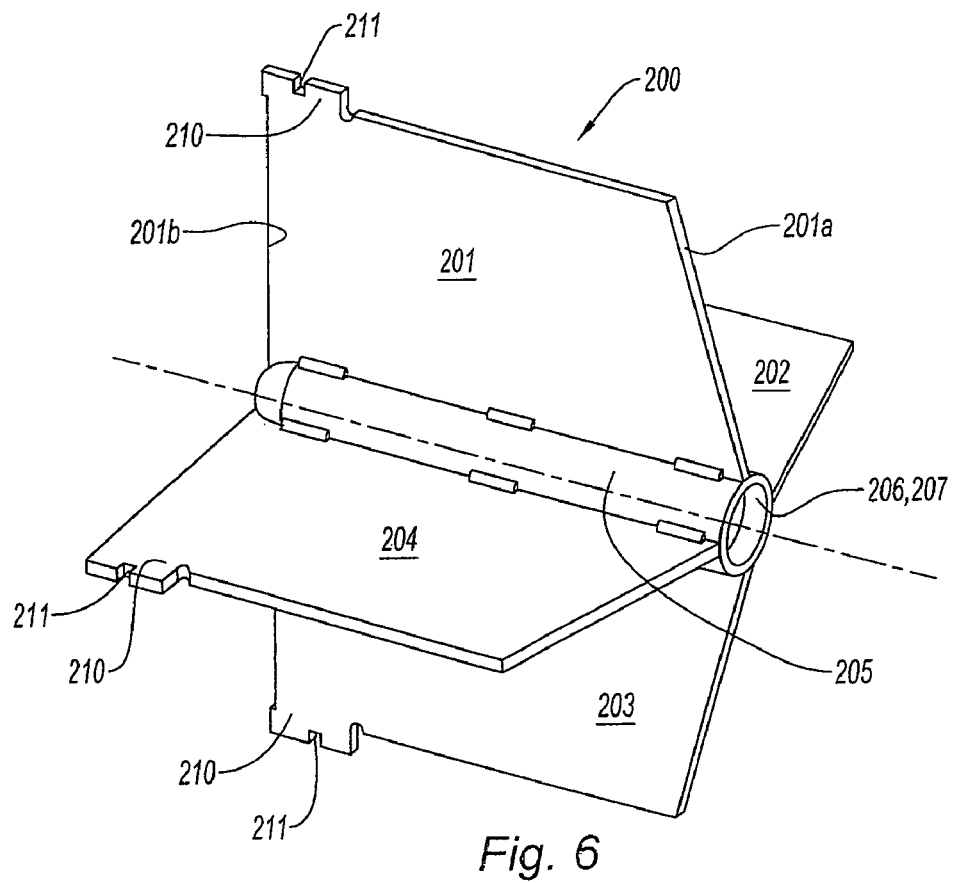

FIG. 3 is an axial section of the main component of the turbine of FIG. 1 with the rotor and the pivot thereof, FIG. 4A is another partial section, extracted from FIG. 3, illustrating the fixed shaft and the pivoting elements carried by this fixed shaft, FIG. 4B is a section of an extract from FIG. 3, illustrating the blade of the propeller and the bearings thereof, FIG. 5 is an isometric view of a stator stop, FIG. 6 is an isometric view of the upstream stator, FIGS. 7A, 7B are two comparative diagrams, with FIG. 7A illustrating the interlace between the rotor and the upstream stator according to the prior art, and the other illustrating the same situation for the interlace between the rotor and the stator in the case of the turbine according to the invention, and FIGS. 8A, 8B are very schematic views of a turbine, with FIG. 8A illustrating a turbine according to the prior art and FIG. 8B a turbine according to the invention showing the zones of viscous friction.

DESCRIPTION OF ONE EMBODIMENT

Figure 1A:
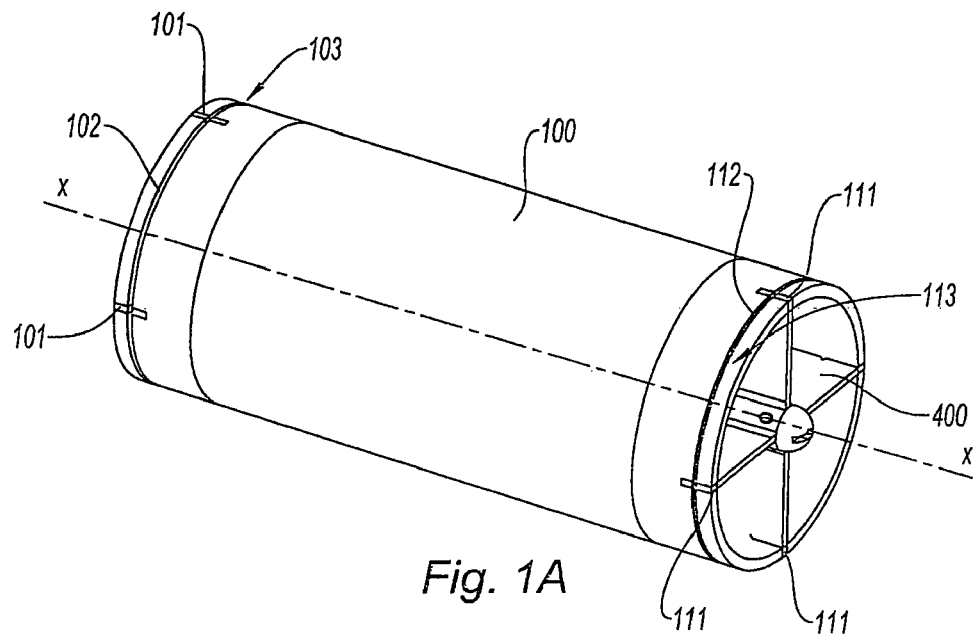
FIG. 1A is an isometric view of a turbine according to the invention.
Figure 1B:
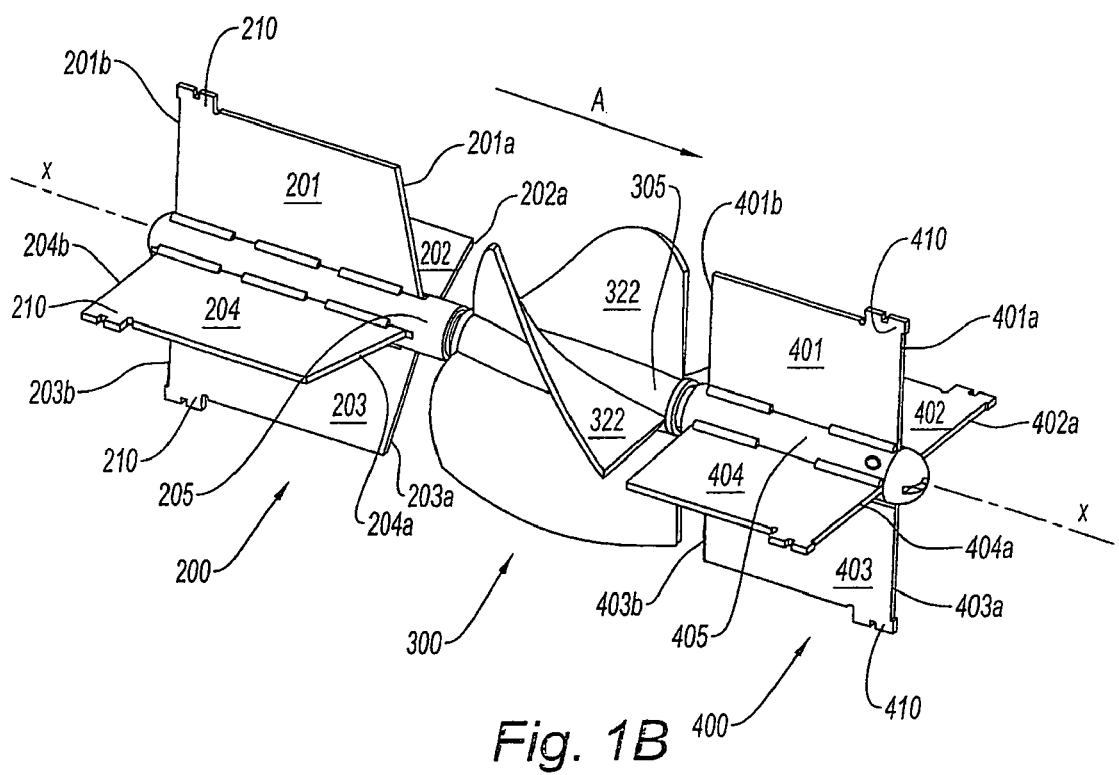
FIG. 1B is an isometric view of the stators and the rotor of the turbine.
Figure 2:
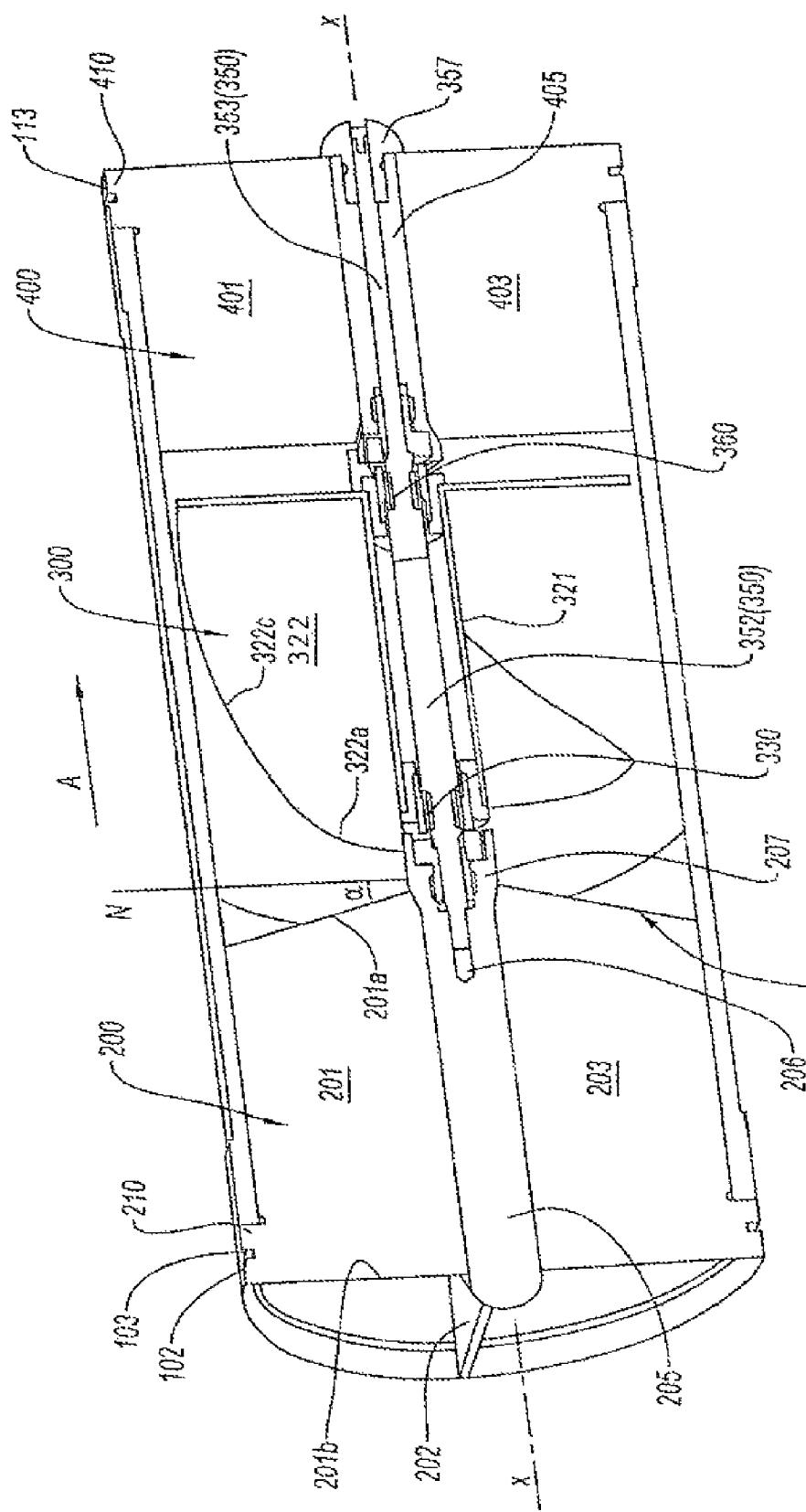
FIG. 2 is a section of the turbine of FIG. 1 along an axial plane.

According to FIGS. 1A, 1B and 2, the invention relates to a turbine for measuring an output of fluid, in particular viscous petroleum products which are charged with a viscosity reduction agent. The fluid flows in the direction of the arrow A which defines the terms upstream/downstream.

The turbine is composed of a tubular body 100 or connection piece which accommodates, in the passage direction (A) of the fluid, an upstream stator 200, a rotor 300 and a downstream stator 400. These various elements are installed along the axis XX of the turbine.

The means for counting or measuring the rotation speed of the turbine, for example, a Hall effect sensor and the signal processing circuit thereof, are not illustrated.

The upstream stator 200 and the downstream stator 400 are each formed by a cross-member which is constituted by planar blades 201-204; 401-404 which are parallel with the direction of the axis XX. These blades 201-204; 401-404 are in a radial arrangement relative to the axis XX and they stabilize the channel of fluid which is passing through the tubular body 100 so that the velocity vector of this channel is as parallel as possible with the axis XX, preventing or reducing turbulent movements.

The blades 201-204; 401-404 are carried by a tubular hub 205, 405 through which a fixed shaft 350 extends and connects the hub 205 of the upstream stator 200 to the hub 405 of the downstream stator 400.

The blades have an outer edge, parallel with the axis XX so that the cross-members of the stators 200, 400 can slide in the tubular body 100.

However, the upstream stator 200 has blades 201-204 with a trailing edge 201a-204a inclined in accordance with a negative angle ax relative to the normal direction or normal plane (N) relative to the axis XX (FIG. 2); the leading edge 201b-204b of the blades is perpendicular relative to the axis XX. The leading edge 401b-404b and the trailing edge 401a-404a of the blades 401-404 of the downstream stator 400 are at right angles, that is to say, perpendicular relative to the axis XX of the turbine.

The rotor 300 which is interposed between the two stators 200-400 is mounted on a pivoting, system which is carried by the fixed shaft 350, which is screwed into the hub 205 of the upstream stator 200 and which extends through the downstream stator 400 in order to reach the output of the turbine.

The rotor 300 will be described in greater detail with reference to the FIGS. 3, 4A, 4B and the isometric view of FIG. 5.

The rotor 300 is composed of a fixed shaft 350, bearing bushes 360 and stops 370 as illustrated in FIG. 4A and a movable assembly formed by a propeller 320 and the bearing bushes 330 thereof illustrated in FIG. 4B.

FIG. 4A illustrates in a very schematic manner, not in accordance with the assembly, the fixed shaft 350 and the various portions of the shaft and the stops 370 which are installed in the upstream stator and the downstream stator and which receive the shaft.

This FIG. 4B, which is illustrated in this manner only for explanatory purposes, does not correspond to an assembly or mounting step of the shaft.

The fixed shaft 350 is composed of a central portion 352 which corresponds substantially to the length of the location of the propeller, with a large diameter, and, at each side, an extension 351, 353 which has a reduced diameter and which forms a shoulder in each case. The fixed shaft 350 has, in a downstream direction, a threaded end 354 in order to fit into a corresponding threaded portion of the hub 205 of the upstream stator 200, followed by a stop 370 which receives the portion 351 and which has a body 371 which accommodates cylindrical pins 372 which are distributed in the form of a circular crown around the axis XX and which constitute an upstream support stop 370$am$ for the movable assembly of the rotor 300. This body 371 is carried by a sleeve 373 which is provided with a threaded portion in order to be screwed into the hub 205 at the downstream side of the upstream stator 200.

After the stop 370, the shaft 350 carries a shaft bearing bush 360 which is wedged against the shoulder with the central portion 352 which has a larger diameter. Then, the elements described for the upstream side of the shaft 350 are repeated but in reverse order and with the same condition as the one set out above, that is to say, these are not steps for mounting the shaft; there is first of all a downstream shaft bearing bush 360, followed by a downstream stop 370$av$ having the same structure (370) as the one 370$am$ described for the upstream side, that is to say, a body 371 which is provided with pins 372 which are distributed over a peripheral crown in order to constitute a stop crown and a threaded portion of sleeve 373 to be screwed into the hub 405 of the downstream stator 400. The upstream and downstream stops 370$am$, 370$av$ have an identical structure. However, the number of pins 372 may be different since, in principle, the downstream stop functions more than the downstream stop. The upstream stop may comprise, for example, three pins 372 and the downstream stop five pins 372.

Downstream of the central portion 352, the shaft continues with the extension 353 having a length L which is indicated schematically and which corresponds very substantially to the path of the hub 405 of the downstream stator 400.

Finally, the end of the shaft comprises a threaded portion 355 with a transverse slot 356 which allows the fixed shaft 350 described above to be screwed or locked in terms of rotation in the hub 205 of the upstream stator; the threaded portion 355 receives the end nut 357 which locks the downstream stator 400 with respect to the shaft 350.

According to FIG. 4B, with reference to this fixed shaft 350, the propeller 320 is composed of a tubular hub 321 which carries the two blades 322. These blades 322 each extend at one side and the other of the axis XX; their leading edge 322$a$ is inclined and rounded in order to reduce the length of the top 322$c$ of the blade 322; the trailing edge 322$b$ is at right angles, that is to say, perpendicular relative to the axis XX.

This inclined and rounded edge allows a gentle leading action via the fluid stream which thus slides over the edge, which prevents the fibres of the viscosity reduction agent from becoming attached to the edge and inhibiting it.

At the upstream side, the hub 321 which forms the hub of the propeller carries a tubular crown 323 which is provided with a bearing bush which forms the protruding bearing bush 330. At the downstream side, the propeller also carries a tubular crown 323 and a bearing bush 330 which forms the protruding downstream bearing.

These two bearing bushes 330 of the bearing are intended to co-operate with the upstream bearing bush 360 and the downstream bearing bush 360 of the fixed shaft 350 and, if necessary, with the stop 370 (370$am$, 370$av$) respectively in accordance with the translation position of the propeller 320 relative to the fixed shaft 350 of the rotor, during operation.

The mounting of the assembly of the turbine as illustrated in FIG. 3 is not carried out in accordance with the disassembly of the elements illustrated in FIGS. 4A and 4B, respectively, since, as already indicated, these Figures have been presented in this manner only for the purposes of the description of the structure of the rotor 300.

For the mounting of the assembly of FIG. 3, the components are installed in succession from the upstream side to the downstream side. The upstream stator 200 is first installed in the tubular body 100, the lugs 210 of the blades 201-204 engaging in the notches 101, the assembly being locked by means of a hoop 102 in a peripheral groove 103 of the tubular body 100.

The upstream stop 370$am$ has been screwed beforehand in the hub 205 of the upstream stator 200.

After the upstream stator 200 has been positioned, the fixed shaft 350 is installed by screwing the upstream threaded end 354 thereof and by using the slot 356 of the downstream end in order to rotate and screw the shaft 350.

Then, the propeller 320 is engaged with the bearing bushes 330 thereof on the fixed shaft 350 and the downstream stator 400 in which the downstream stop 370$av$ has been screwed is installed.

The downstream stator 400 is locked in terms of rotation by positioning its lugs 410 in the notches 111 of the downstream edge of the tubular body 100. The downstream stator 400 is retained by means of a hoop 112 in the groove 113 then the downstream stator 400 is locked using the end nut 357 which is screwed to the threaded portion 355 of the fixed shaft 350 and which terminates in a rounded head which is provided with a slot 356.

FIGS. 5 and 6 illustrate in detail the various components of the turbine:

According to FIG. 5, the stop 370 is constituted by a body 371 with a crown which has a central hole 375 for the passage of the fixed shaft 350 and two screwing notches 376. The body 371 is provided with housings which receive cylindrical pins 372 which have a curved head and which are preferably constructed from carbide; the pins form the stop surface. In the example set out, there are six cylindrical pins which thus protrude from the front face of the body 371 so that only the face of the pins forms the stop surface. The stop 370 also comprises the portion in the form of a sleeve 373 with a threaded outer surface.

According to FIG. 6, the upstream stator 200 has the outer edge of the blades 201-204 extended with a lug 210 which is intended to fit in the longitudinal notch 101 which is formed in the input edge of the tubular body 100 (FIG. 1) in order to be locked in the peripheral direction. The two threaded portions 206, 207 which are intended to receive the threaded end 354 of the fixed shaft 350 and the threaded portion of sleeve 373 of the upstream stop 370$am$, respectively, are simply indicated in a schematic manner.

The specific effects of the turbine according to the invention will be explained below with reference to the schematic FIGS. 7A, 7B, 8A, 8B.

FIG. 7A illustrates a known upstream stator 200A, which is illustrated without the tubular body and the propeller of the rotor 300A. This stator has fins 201A, . . . , 203A with a right-angled trailing edge 201$a$A which is perpendicular relative to the axis XX of the turbine.

Opposite this trailing edge 201aA is the leading edge 322aA of the propeller of the rotor 300A. The outer or upper edge 322cA of the blade 322A of the propeller is constituted by a helical line which extends over the inner face of the tubular body.

This Figure emphasizes, in the portion surrounded by an ellipse EA, the closeness between the trailing edge 221aA and the leading edge 322aA.

By way of comparison, FIG. 7B illustrates the same situation as FIG. 7A, but for the turbine of the invention, showing the spacing between the trailing edge 221a (and for the other trailing edges by symmetry) of the blade 201a of the upstream stator 200, inclined through the negative angle α relative to the normal relative to the axis XX of the turbine and also the recessed curved profile of the leading edge 322a of the blade 322 of the propeller of the rotor 300. The portion which is surrounded by a circle C emphasizes the spacing separating these two edges.

FIGS. 8A, 8B are diagrams showing the interaction of the trailing edges, leading edges and the upper portions of the propeller with the inner contour of the tubular body.

In this manner, FIG. 8A illustrates the blades 201A, 203A of the upstream stator 200A of a known turbine with the rotor 300A whose blades 322A have an upper side 322cA which moves close to the inner face of the tubular body 100A. This passage generates viscous friction. The same applies in the region of the trailing edge 221aA of the stator 200A and the leading edge 322aA of the blade 322A of the rotor 300A.

The viscous friction is illustrated each time with parallel lines which are carried by the edge of mutually facing components.

FIG. 8B illustrates the transposition of this situation for the turbine according to the invention which clearly shows the reduction of the lines which produce viscous friction between, on the one hand, the upstream stator 200 and the propeller 300 and, on the other hand, the upper edge 322c of the blades 322 of the propeller and the inner contour of the tubular body 100.

What is claimed is:

1. Turbine for measuring petroleum products which are charged with a viscosity reduction agent, comprising: a tubular body which receives, in the axial extension thereof in the passage direction of the fluid, an upstream stator, a rotor and a downstream stator, the stators being formed by cross-members whose blades are planar and parallel with the axis of the turbine, and the rotor is a propeller having a plurality of blades, a means for detecting the rotation of the rotor in order to provide information relating to the output, characterized in that the trailing edge of the blades of the upstream stator is inclined through a negative angle relative to a normal relative to the axis, the leading edge of the blades of the propeller is inclined and rounded in an incline which is directed downstream, the rotational mounting of the propeller in the turbine involves: a fixed shaft which is installed in the upstream and downstream stators, and which carries an upstream bearing bush and a downstream bearing bush, close to the end of the location of the propeller, a peripheral upstream stop and downstream stop relative to the upstream bearing bush and the downstream bearing bush, the fixed shaft extending through each of the stops which is formed by a crown of support pins, the propeller comprises a tubular hub through which the fixed shaft extends and which has a bearing bush at each end in order to each co-operate at the same time with the corresponding bearing bush of the fixed shaft and with the corresponding peripheral stop.

2. Turbine according to claim 1, characterized in that the fixed shaft comprises a threaded upstream end which is intended to be screwed into a threaded portion produced in the hub of the upstream stator, followed by the location for the upstream stop and the location of the upstream shaft bearing bush, and a central portion of increased diameter which forms a shoulder for the upstream shaft bearing bush and the downstream shaft bearing bush, and downstream of the downstream bearing bush, a downstream stop, the shaft being extended by a length which corresponds to the axial length of the downstream stop to terminate in a threaded portion which is intended to receive the nut which blocks the downstream stator.

3. Turbine according to claim 2, characterized in that the upstream stop and the downstream stop are each constituted by a body which carries, distributed in a peripheral manner, carbide pins which form the stop surface, this body terminating in a sleeve which is provided externally with a thread in order to be screwed into a corresponding threaded portion of the upstream hub and the downstream hub, and a passage for the fixed shaft.

4. Turbine according to claim 1, characterized in that the upstream stop and the downstream stop are each constituted by a body which carries, distributed in a peripheral manner, carbide pins which form the stop surface, this body terminating in a sleeve which is provided externally with a thread in order to be screwed into a corresponding threaded portion of the upstream hub and the downstream hub, and a passage for the fixed shaft.

5. Turbine according to claim 1, characterized in that the angle of the trailing edge of the blades of the upstream stator relative to the plane perpendicular relative to the axis of the turbine is a negative angle of between 5° and 30° and in particular in the order of 15°.

* * * * *